United States Patent
Aoki

(10) Patent No.: US 9,625,018 B2
(45) Date of Patent: Apr. 18, 2017

(54) AUTOMATIC TRANSMISSION APPARATUS

(71) Applicant: HONDA MOTOR CO., LTD., Tokyo (JP)

(72) Inventor: Takashi Aoki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 183 days.

(21) Appl. No.: 14/440,133

(22) PCT Filed: Nov. 1, 2013

(86) PCT No.: PCT/JP2013/079708
§ 371 (c)(1),
(2) Date: May 1, 2015

(87) PCT Pub. No.: WO2014/073479
PCT Pub. Date: May 15, 2014

(65) Prior Publication Data
US 2015/0316147 A1 Nov. 5, 2015

(30) Foreign Application Priority Data

Nov. 6, 2012 (JP) ................................ 2012-244630

(51) Int. Cl.
*F16H 37/06* (2006.01)
*F16H 9/04* (2006.01)
*F16H 37/02* (2006.01)
*F16H 61/662* (2006.01)

(52) U.S. Cl.
CPC ......... *F16H 37/021* (2013.01); *F16H 61/662* (2013.01); *Y10T 74/19019* (2015.01)

(58) Field of Classification Search
CPC ............. F16H 37/021; F16H 2037/023; F16H 2037/025; F16H 2037/026
USPC ............................................ 74/664, 665 GE
See application file for complete search history.

(56) References Cited

U.S. PATENT DOCUMENTS

| | | | |
|---|---|---|---|
| 4,740,191 A | | 4/1988 | Takano et al. |
| 4,843,918 A | * | 7/1989 | Morimoto ............. F16H 47/065 192/3.31 |
| 4,846,765 A | * | 7/1989 | Sakai .................. F16H 61/0021 474/28 |

(Continued)

FOREIGN PATENT DOCUMENTS

| | | |
|---|---|---|
| JP | 49 7931 A | 1/1974 |
| JP | 60-145655 U | 9/1985 |

(Continued)

OTHER PUBLICATIONS

International Search Report application No. PCT/JP2013/079708 dated Dec. 10, 2013.

*Primary Examiner* — Ha D Ho
(74) *Attorney, Agent, or Firm* — Squire Patton Boggs (US) LLP

(57) ABSTRACT

A predetermined transmission ratio of a direct coupling mechanism arranged in parallel to the continuously variable transmission and directly connects the input shaft and the output shaft to transmit rotation of the input shaft to the output shaft at that predetermined transmission ratio is set to the minimum transmission ratio of the continuously variable transmission, and the direct coupling mechanism is connected to the input shaft through a third clutch.

10 Claims, 10 Drawing Sheets

(56) References Cited

U.S. PATENT DOCUMENTS 4,955,260 A    9/1990  Oshidari
5,924,534 A *  7/1999  Okubo ................. F16H 37/021
                                                    192/3.24

FOREIGN PATENT DOCUMENTS

| JP | 62-228749 A   | 10/1987 |
| JP | 64-074349 A   |  3/1989 |
| JP | 01-250652 A   | 10/1989 |
| JP | 2013-113338 A |  6/2013 |

* cited by examiner

FIG.3

FROM CVT MODE TO DIRECT-COUPLE MODE

| MODE | CVT MODE | TRANSITION MODE 1 | TRANSITION MODE 2 | DIRECT-COUPLE MODE |
|---|---|---|---|---|
| TORQUE FLOW | | | | |
| TORQUE TRANSMISSION | CVT | CVT → DIRECT | DIRECT | DIRECT |
| CVT-DIRECT COUPLE SWITCHING MECHANISM | CVT | CVT → DIRECT | DIRECT | DIRECT |
| WHEEL-CVT CONNECT/ DISCONNECT MECHANISM | CONNECTS | CONNECTS | CONNECTS → DISCONNECTS | DISCONNECTS |
| PULLEY PRESSURE | CHANGES RATIO AND TRANSMITS TORQUE | CHANGES RATIO AND TRANSMITS TORQUE | CHANGES RATIO AND TRANSMITS TORQUE | MAINTAINS RATIO DURING STOP |
| PULLEY ROTATION | ROTATES | ROTATES | ROTATES-STOPS | STOPS |

FIG.4

FROM DIRECT-COUPLE MODE TO CVT MODE

| MODE | DIRECT-COUPLE MODE | TRANSITION MODE 3 | TRANSITION MODE 4 | CVT MODE |
|---|---|---|---|---|
| TORQUE FLOW | | | | |
| TORQUE TRANSMISSION | DIRECT | DIRECT | DIRECT → CVT | CVT |
| CVT-DIRECT COUPLE SWITCHING MECHANISM | DIRECT | DIRECT | DIRECT → CVT | CVT |
| WHEEL-CVT CONNECT/ DISCONNECT MECHANISM | DISCONNECTS | DISCONNECTS → CONNECTS | CONNECTS | CONNECTS |
| PULLEY PRESSURE | MAINTAINS RATIO DURING STOP | CHANGES RATIO AND TRANSMITS TORQUE | CHANGES RATIO AND TRANSMITS TORQUE | CHANGES RATIO AND TRANSMITS TORQUE |
| PULLEY ROTATION | STOPS | STOPS → ROTATES | ROTATES | ROTATES |

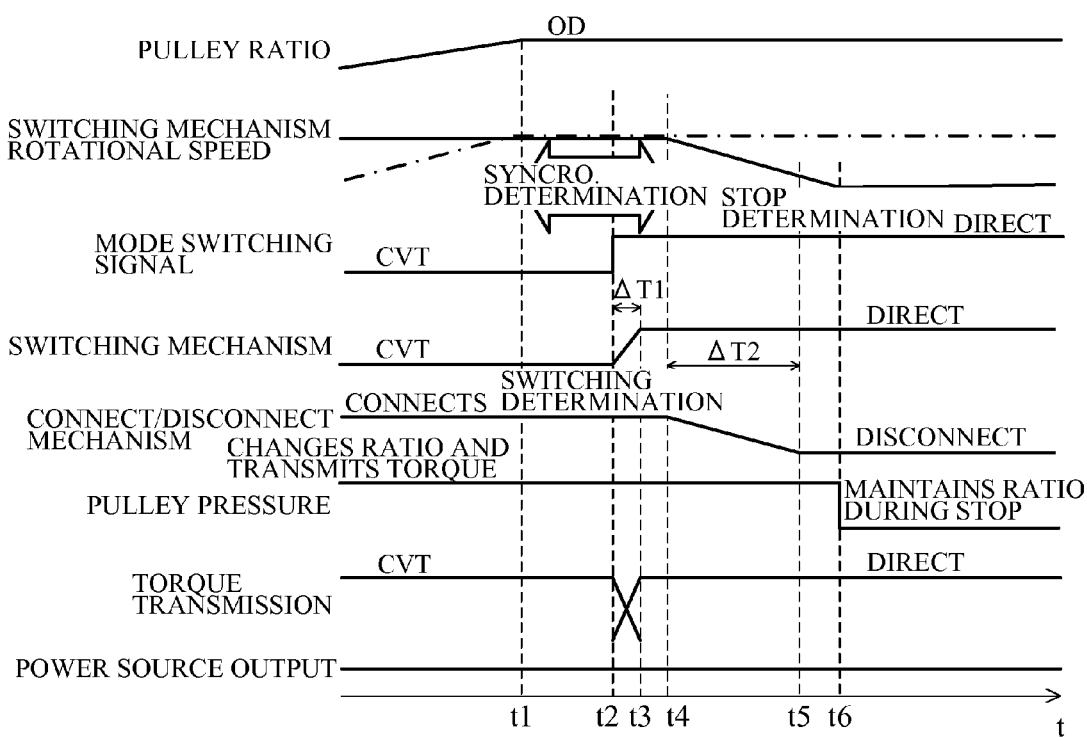

AUTOMATIC TRANSMISSION APPARATUS

TECHNICAL FIELD

This invention relates to an automatic transmission apparatus, more specifically an automatic transmission apparatus equipped with two kinds of power transmission system, namely, a continuously variable transmission (CVT) and a direct coupling mechanism.

BACKGROUND ART

On a suburban road or expressway, a continuously variable transmission runs mostly in overdrive (overdrive transmission ratio). And the overdrive transmission ratio is the most frequently used ratio in total driving. Fuel economy performance on suburban roads and expressways can therefore be improved by installing a direct coupling mechanism and implementing overdrive in a direct mode through the direct coupling mechanism.

When a belt-type transmission is operating in overdrive, the winding diameter on the driven pulley side is reduced and the ring bending stress is high, so that the service life of the belt can be improved by driving with the most frequently used overdrive transmission ratio directly coupled. However, even when no torque is being transmitted, the idle rotation of the belt and pulleys causes torque loss and ring bending fatigue. The belt and pulleys must therefore be put in a non-rotating state during direct coupling.

Regarding this point, Patent Reference 1 teaches an automatic transmission apparatus comprising a continuously variable transmission having a drive pulley connected through a first clutch to an input shaft connected to a power source mounted in a vehicle, a driven pulley connected through a second clutch to an output shaft connected to driven wheels and an endless flexible member wound around the drive and driven pulleys, and, arranged in parallel to the continuously variable transmission, a (chain or gear type) direct coupling mechanism that directly connects the input shaft and output shaft and transmits rotation of the input shaft to the output shaft at a fixed (predetermined) transmission ratio, which automatic transmission apparatus is configured to enable establishment of a first power transmission system by means of the continuously variable transmission or a second power transmission system by means of the direct coupling mechanism.

The automatic transmission apparatus of Patent Reference 1 is configured to connect the direct coupling mechanism establishing the second power transmission system through a third clutch, connect the first clutch and the second clutch and disconnect the third clutch when establishing the first power transmission system, and connect the third clutch and disconnect the first clutch and the second clutch when establishing the second power transmission system.

PRIOR ART REFERENCES

Patent References

Patent Reference 1: Japanese Examined Patent Publication No. Sho 57 (1982)-23136

SUMMARY OF INVENTION

Problems to be Solved by the Invention

As stated in the foregoing, the usual practice with a continuously variable transmission is for the input shaft to be set based on the maximum rotational speed of the power source, the output shaft to be set based on the maximum vehicle speed reachable on level ground, and the maximum vehicle speed pulley reduction ratio to be set to a value larger than the overdrive transmission ratio, in view of which the teaching of Patent Reference 1 has a drawback in that the fact that the direct coupling mechanism is connected to the output shaft by the third clutch means that the rotational speed inputted to the third clutch becomes high.

As a result, it becomes necessary to increase the rotational strength, durability and the like of the third clutch and to take measures for dealing with co-rotation caused by overspeed rotation and increased lubrication, while a risk of louder noise due to faster direct coupling mechanism speed also emerges along with other secondary problems.

The object of this invention is therefore to overcome such drawbacks by providing an automatic transmission apparatus equipped with two kinds of power transmission system, namely, a continuously variable transmission and a direct coupling mechanism, wherein rotation inputted to a third clutch for establishing the second power transmission system by means of the direct coupling mechanism is decreased.

Means for Solving the Problems

In order to achieve the object, claim 1 is configured to have an automatic transmission apparatus, having: an input shaft connected to a power source installed in a vehicle; an output shaft connected to driven wheels; a continuously variable transmission equipped with a drive pulley connected through a first clutch to the input shaft, a driven pulley connected through a second clutch to the output shaft, and an endless flexible member wound therearound; a direct coupling mechanism that is arranged in parallel to the continuously variable transmission and directly connects the input shaft and the output shaft to transmit rotation of the input shaft to the output shaft at a predetermined transmission ratio; and a control means that controls establishing of a first power transmission system by means of the continuously variable transmission and a second power transmission system by means of the direct coupling mechanism; wherein the improvement comprises: the predetermined transmission ratio of the direct coupling mechanism is set to a minimum transmission ratio of the continuously variable transmission; the direct coupling mechanism is connected to the input shaft through a third clutch; and the control means connects the first clutch and the second clutch and disconnects the third clutch when establishing the first power transmission system, while connecting the third clutch and disconnecting the first clutch and the second clutch when establishing the second power transmission system.

The automatic transmission apparatus according to claim 2 is configured such that, the control means connects the third clutch and disconnects the first clutch if it is determined that the transmission ratio of the continuously variable transmission in the first power transmission system is substantially coincident with the minimum transmission ratio when establishing the second power transmission system, and then disconnects the second clutch gradually when the second power transmission system has been established.

The automatic transmission apparatus according to claim 3 is configured such that, the control means gradually connects the second clutch when the second power transmission system has been established, and then disconnects the third clutch and connects the first clutch if it is determine that the rotational speed of the direct coupling mechanism is substantial synchronized with the rotational speed of the continuously variable transmission when establishing the first power transmission system.

The automatic transmission apparatus according to claim 4 is configured such that, the continuously variable transmission is a transmission operated when supplied with hydraulic oil to the drive pulley and the driven pulley, and the control means lowers the pressure of the hydraulic oil to be supplied to the drive pulley and the driven pulley to a predetermined pressure when the second power transmission system has been established.

The automatic transmission apparatus according to claim 5 is configured such that, the predetermined pressure is set to a pressure sufficient for maintaining the transmission ratio.

Effects of the Invention

In the automatic transmission apparatus according to claim 1, since the predetermined transmission ratio of the direct coupling mechanism arranged in parallel to the continuously variable transmission and directly connects the input shaft and the output shaft to transmit rotation of the input shaft to the output shaft at that predetermined transmission ratio is set to the minimum transmission ratio of the continuously variable transmission, and the direct coupling mechanism is connected to the input shaft through the third clutch, in other words, since it is configured such that the third clutch is arranged at the input shaft side where the rotation of the direct coupling mechanism is decreased than the output shaft side, speed-decreased rotation of the input shaft is inputted to the third clutch when power is transmitted by the first power transmission system by means of the continuously variable transmission, whereby the rotational speed inputted to the clutch (third clutch) that establishes the second power transmission system by means of the direct coupling mechanism can be decreased. As a result, measures for upgrading the rotational strength and durability of the third clutch become unnecessary, the need for measures for dealing with co-rotation and the like can also be eliminated, and the rotational speed of the direct coupling mechanism is decreased, so that noise can be lowered in proportion.

Explaining this with reference to figures, FIG. 12 is a partial schematic diagram showing an automatic transmission apparatus according to Patent Reference 1 and FIG. 13 is an explanatory diagram showing how output shaft rotational speed (vehicle speed) V varies as a function of input shaft rotational speed (engine rotational speed) NE in the automatic transmission apparatus shown in FIG. 12.

As illustrated, the apparatus according to the technology of Patent Reference 1 comprises a CVT (continuously variable transmission) having a drive pulley connected to an input shaft through a first clutch, a driven pulley connected to an output shaft through a second clutch, and a belt (endless flexible member) wound therearound, and, arranged in parallel to the CVT, a direct coupling mechanism that directly connects the input shaft and output shaft and transmits rotation of the input shaft to the output shaft at a predetermined (fixed) transmission ratio, which apparatus is configured to enable power transmission by establishing a first power transmission system by means of the CVT or a second power transmission system by means of the direct coupling mechanism and configured to connect the direct coupling mechanism to the output shaft through a third clutch.

In the technology of Patent Reference 1, when the first power transmission system is established, the flow of power during CVT transmission is as indicated by an arrow (solid line) and rotation of the direct coupling mechanism at this time is as indicated by another arrow (broken line), so that when power is transmitted by the first power transmission system the CVT, the speed-increased rotation of the output shaft is inputted to the third clutch, thus making it disadvantageously increase the rotation to be inputted to the third clutch.

In other words, when the first power transmission system is established, the rotational speed of the direct coupling mechanism is increased, so that at maximum engine rotational speed NEmax, the output shaft rotational speed (vehicle speed V) disadvantageously exceeds the maximum output shaft rotational speed (Vmax) and reaching Vmax x iTop/iOD.

As a result, measures for increasing the rotational strength and durability of the third clutch become necessary, while co-rotation due to overspeed rotation, increased noise of the direct coupling mechanism and other problems also arise.

The usual practice in a belt-type CVT is to set the speed-decreasing and speed-increasing ratios at almost equal values centered on a 1:1 ratio, and as shown in FIG. 13, where the ratio upon reaching maximum speed on level ground is defined as iTop, iTop is set to a value larger than iOD (i: pulley ratio).

In contrast, as shown in FIG. 1, the automatic transmission apparatus according to claim 1 is configured to have a structure similar to that of Patent Reference 1, the predetermined transmission ratio of the direct coupling mechanism is set to the minimum transmission ratio of the CVT, and the direct coupling mechanism is connected to the input shaft through the third clutch, the first clutch and the second clutch are connected when establishing the first power transmission system, while connecting the third clutch and disconnecting the second clutch when establishing the second power transmission system.

FIG. 2 is an explanatory diagram showing relation between the output shaft rotational speed (vehicle speed) V and input shaft rotational speed (engine rotational speed) NE in the automatic transmission apparatus according to claim 1.

Since the predetermined transmission ratio of the direct coupling mechanism is set at the overdrive transmission ratio (minimum transmission ratio) of the CVT, the direct coupling mechanism is connected to the input shaft through the third clutch, the first clutch and second clutch are connected when the first power transmission system is established, when the first power transmission system is established, the rotational speed of the input shaft, which is low in comparison with the rotational speed of the output shaft, is inputted to the direct coupling mechanism on the input shaft side, so that the speed of rotation of the direct coupling mechanism on the input shaft side is decreased.

As a result, even at the maximum output shaft rotational speed (the rotational speed reaching maximum speed on level ground) Vmax, the input side rotational speed (engine rotational speed NE) falls below the maximum engine rotational speed NEmax and can be kept within NEmax x iOD/iTop.

In other words, when power is transmitted in the first power transmission system using the CVT, speed-decreased rotation is inputted to the third clutch, since the rotational speed to be inputted to the third clutch that establishes the second power transmission system by means of the direct coupling mechanism, the rotational strength and durability of the third clutch do not need to be upgraded and the need to deal with co-rotation can be mitigated. In addition, the rotational speed of the direct coupling mechanism is decreased, so that noise can be lowered in proportion.

Further, since it is configured such that the first clutch and the second clutch are connected and the third clutch is disconnected when establishing the first power transmission system, while connecting the third clutch and disconnecting the first clutch and the second clutch when establishing the second power transmission system, when the second power transmission system is established, the load on the power source can be reduced because the continuously variable transmission is cut off from the power source and put in a non-rotating state.

Since the automatic transmission apparatus according to claim 2 is configured such that, the control means connects the third clutch and disconnects the first clutch if it is determined that the transmission ratio of the continuously variable transmission in the first power transmission system is substantially coincident with the minimum transmission ratio (OD) when establishing the second power transmission system, and then disconnects the second clutch gradually when the second power transmission system has been established, the third clutch is connected when the rotational speed of the direct coupling mechanism and the rotational speed of the drive pulley of the continuously variable transmission are in a synchronized state, so that, in addition to the aforesaid effects, it is possible to establish the second power transmission system in a short time, i.e., to switch from the first power transmission system to the second power transmission system in a short time, without jolting the vehicle occupants.

Moreover, since it is configured such that, when establishment of the second power transmission system is determined, the second clutch is gradually disconnected, the pulley rotation of the continuously variable transmission can be reduced slowly, so that inertial shock can be reduced and exposure of the vehicle occupants to an uncomfortable inertial force can be more completely avoided.

Since the automatic transmission apparatus according to claim 3 is configured such that, the control means gradually connects the second clutch when the second power transmission system has been established, and then disconnects the third clutch and connects the first clutch if it is determine that the rotational speed of the direct coupling mechanism is substantially synchronized with the rotational speed of the continuously variable transmission when establishing the first power transmission system, in addition to the aforesaid effects, the third clutch is disconnected when the rotational speed of the direct coupling mechanism and the rotational speed of the drive pulley of the continuously variable transmission are in a synchronized state, whereby enabling to establish the first power transmission system in a short time, i.e., to switch from the second power transmission system to the first power transmission system in a short time, without jolting the vehicle occupants.

In addition, since it is configured such that the second clutch is gradually connected while the second power transmission system is established, the pulley rotation of the continuously variable transmission can be increased slowly, so that inertial shock can be reduced and exposure of the vehicle occupants to an uncomfortable inertial force can be more completely avoided.

Further, since it is configured such that the continuously variable transmission maintains the overdrive transmission ratio while the second power transmission system is established, transition time between the power transmission systems can be shortened because no ratio matching is necessary during transitioning.

Since the automatic transmission apparatus according to claim 4 is configured such that, the continuously variable transmission is a transmission operated when supplied with hydraulic oil to the drive pulley and the driven pulley, and the control means lowers the pressure of the hydraulic oil to be supplied to the drive pulley and the driven pulley to a predetermined pressure when the second power transmission system has been established, in addition to the aforesaid effects, it becomes possible to improve fuel efficiency.

More specifically, while the second power transmission system is established, the pulleys of the continuously variable transmission are cut off at the input and output, so that loss attributable to rotation of the endless flexible member and the pulleys can be substantially eliminated, and the pulley pressures to be supplied to the drive pulley and the driven pulley can be lowered to the predetermined pressures. As a result, the hydraulic pump pressure can be reduced, thereby reducing hydraulic pump loss and improving fuel efficiency.

Since the automatic transmission apparatus according to claim 5 is configured such that, the predetermined pressure is set to a pressure sufficient for maintaining the transmission ratio (ratio), in addition to the aforesaid effects, it becomes possible to further reduce pressure and further improve fuel efficiency. Further, since the pulleys and the endless flexible member maintain the overdrive transmission ratio state, no interference, rattle or pounding occurs.

BRIEF DESCRIPTION OF DRAWINGS

FIG. 3 is an explanatory diagram of torque flow when the second power transmission system is established in the automatic transmission apparatus shown in FIG. 1.

FIG. 4 is an explanatory diagram of torque flow when the first power transmission system is established in the automatic transmission apparatus shown in FIG. 1.

FIG. 5 is a timing chart showing operations when the second power transmission system is established in the automatic transmission apparatus shown in FIG. 1.

DESCRIPTION OF EMBODIMENTS

Embodiments for implementing the automatic transmission apparatus according to this invention are explained with reference to the attached drawings in the following.

Embodiment 1

Figure 1:
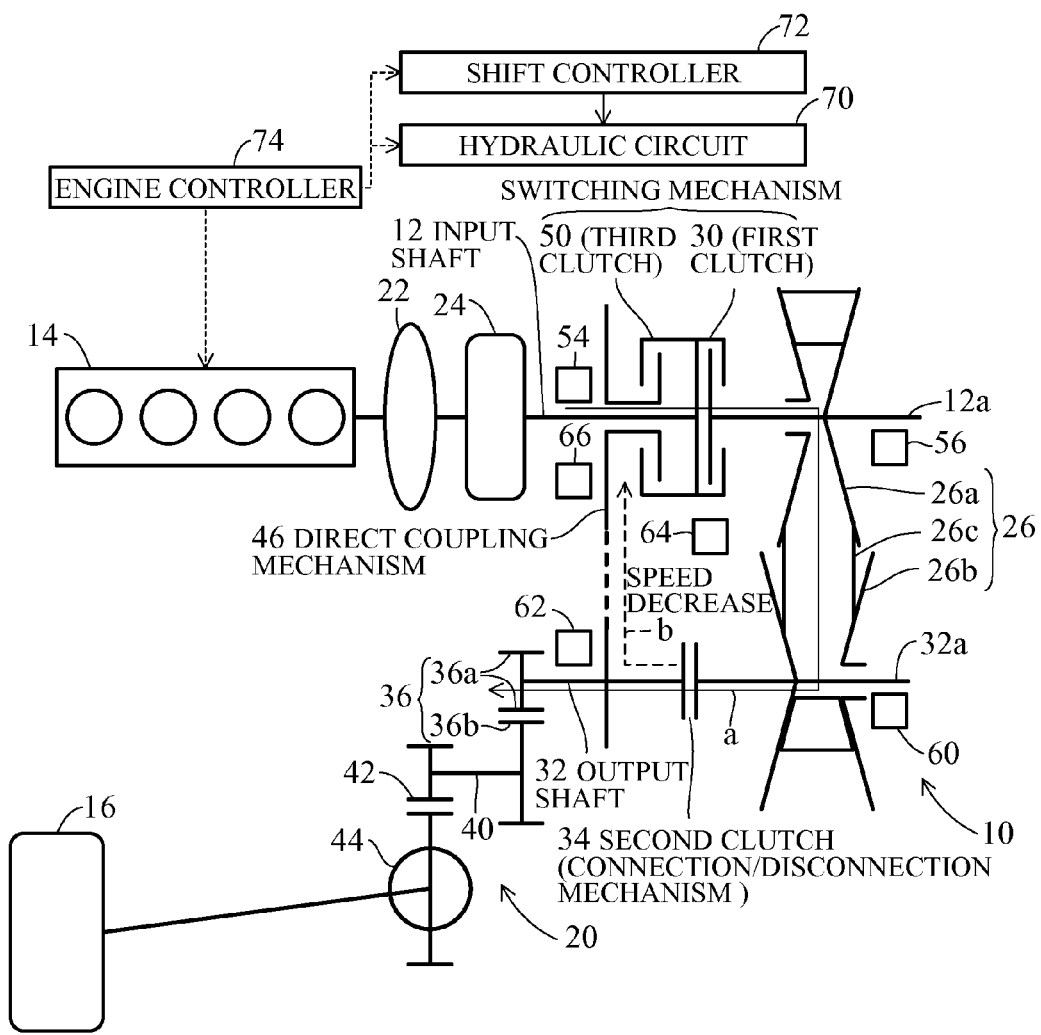
FIG. 1 is an overall schematic diagram showing an automatic transmission apparatus according to a first embodiment of this invention.
Figure 2:
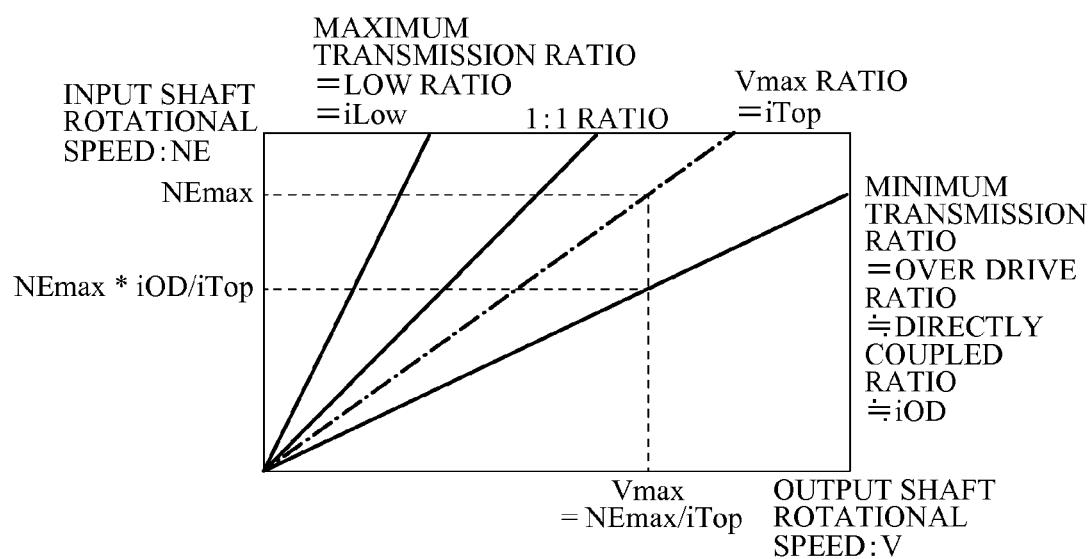
FIG. 2 is an explanatory diagram showing how output shaft rotational speed (vehicle speed) V varies as a function of input shaft rotational speed (engine rotational speed) NE in the automatic transmission apparatus shown in FIG. 1.

FIG. 1 is an overall schematic diagram showing an automatic transmission apparatus according to a first embodiment of this invention, and FIG. 2 is an explanatory diagram showing how output shaft rotational speed (vehicle speed) V varies as a function of input shaft rotational speed (engine rotational speed) NE in the configuration shown in FIG. 1.

Reference symbol 10 in FIG. 1 designates an automatic transmission apparatus. An input shaft 12 of the automatic transmission apparatus 10 is connected to an engine (internal combustion engine; power source) 14. The engine 14 is installed in a vehicle 20 equipped with driven wheels 16. (The vehicle 20 is depicted only partially by the driven wheels 16 and some other constituents.)

Specifically, the input shaft 12 is connected at one end through a starter mechanism 22 and a forward/reverse changeover mechanism 24 to the engine 14 and connected at another end to a continuously variable transmission (CVT) 26.

The starting mechanism 22 comprises a torque converter or a starting clutch, and the forward/reverse changeover mechanism 24 comprises a forward clutch that enables the vehicle 20 to travel forward, a reverse brake-clutch that enables it to travel rearward, and a planetary gear mechanism located between the two clutches.

The input shaft 12 is connected through a first clutch 30 to a pulley input shaft 12a, and an output shaft 32 lying parallel to the input shaft 12 is connected through a second clutch 34 to a pulley output shaft 32a.

The CVT 26 comprises a drive pulley 26a connected to the pulley input shaft 12a, a driven pulley 26b connected to the pulley output shaft 32a, and an endless flexible member, e.g., a metal V belt 26c, wound around the drive and driven pulleys.

The first clutch 30 and the second clutch 34 are both wet hydraulic clutches (friction clutches) supplied with hydraulic oil (hydraulic pressure) to operate between engaged (connected) and disengaged (disconnected) states.

Although not illustrated in the drawings, the drive pulley 26a comprises a fixed pulley half fitted on a peripheral shaft of the pulley input shaft 12a to be incapable of relative rotation and of axial direction movement, and a movable pulley half fitted on the peripheral shaft to be incapable of relative rotation and capable of relative movement with respect to the fixed pulley half in the axial direction. The driven pulley 26b comprises a fixed pulley half fitted on a peripheral shaft of the pulley output shaft 32a to be incapable of relative rotation and of axial direction movement and a movable pulley half fitted on the peripheral shaft to be incapable of relative rotation and capable of relative movement with respect to the fixed pulley half in the axial direction.

The rotation of the output shaft 32 is transmitted to an intermediate shaft 40 through gears 36 (drive gear 36a and driven gear 36b) and the rotation of the intermediate shaft 40 is transmitted to the left and right driven wheels (only the left wheel shown) 16 through a gear 42 and a differential 44.

The automatic transmission apparatus 10 comprises the CVT 26 and a direct coupling mechanism 46 aligned in parallel. The direct coupling mechanism 46 is a chain transmission apparatus that directly connects the input shaft 12 and output shaft 32 and transmits rotation of the input shaft 12 to the output shaft 32 at a fixed (predetermined) transmission ratio.

The fixed transmission ratio of the direct coupling mechanism 46 is set to the minimum transmission ratio of the CVT 26 (the overdrive transmission ratio). The direct coupling mechanism 46 is connected to the input shaft 12 through a third clutch 50. Like the first and second clutches 30, 34, the third clutch 50 is also a hydraulic clutch (friction clutch).

As illustrated, the CVT 26 and the direct coupling mechanism 46 are arranged in parallel between the input shaft 12 and pulley input shaft 12a on the one hand and the output shaft 32 and pulley output shaft 32a on the other hand. Therefore, the automatic transmission apparatus 10 is equipped with two paths for transmitting the power of the engine 14 to the driven wheels 16, namely a first power transmission system by means of (through) the CVT 26 and a second power transmission system by means of (through) the direct coupling mechanism 46.

An input shaft rotational speed sensor 54 provided on the input shaft 12 outputs a pulse signal indicating the rotational speed of the input shaft 12 connected to the CVT 26, and an NDR sensor (rotational speed sensor) 56 provided near the drive pulley 26a of the CVT 26 outputs a pulse signal proportional to the rotational speed of the drive pulley 26a (rotational speed of the pulley input shaft 12a) NDR.

An NDN sensor (rotational speed sensor) 60 provided near the driven pulley 26b outputs a pulse signal indicating the rotational speed NDN of the driven pulley 26b, and an output shaft rotational speed sensor 62 provided on the output shaft 32 outputs a pulse signal indicating the rotational speed on the output side of the direct coupling mechanism 46 (i.e., vehicle speed V, more exactly the vehicle speed before correction by the final transmission ratio).

In addition, an oil pressure switch 64 provided on the first clutch 30 produces an output indicating connection/disconnection of the first clutch 30, and an oil pressure switch 66 provided on the third clutch 50 produces an output indicating connection/disconnection of the third clutch 50.

The automatic transmission apparatus 10 is provided with a hydraulic circuit 70 and a shift controller 72. The hydraulic circuit 70 is equipped with a hydraulic pump (oil pump; not shown), which is driven by the engine 14 to pump up hydraulic oil stored in a reservoir and deliver it to oil passages. Various electromagnetic control valves are deployed in the oil passages.

The outputs of the input shaft rotational speed sensor 54 and other sensors are sent to the shift controller 72. The shift controller 72 comprises a microcomputer including a CPU, ROM, RAM, I/O and other components. Similarly, the engine 14 is equipped with an engine controller 74, also comprising a microcomputer, that controls the operation of the engine 14 based on the outputs of a crank angle sensor and various other sensors.

The shift controller 72 is communicably connected to the engine controller 74. By energizing/de-energizing the electromagnetic control valves of the hydraulic circuit 70 based on the outputs received from the NT sensor 54 and other sensors and the sensor outputs obtained by communicating with the engine controller 74, it controls the supply of hydraulic pressure to the CVT 26 and the like that control the operation of the starting mechanism 22, forward/reverse changeover mechanism 24, CVT 26, and first and second clutches 30, 34, thereby controlling their operation.

By way of explanation taking the CVT 26 as an example, the shift controller 72 supplies high-pressure hydraulic oil through the hydraulic circuit 70 to piston chambers of the movable pulley halves, thereby generating pulley pressures (clamping forces) that move the moveable pulley halves in the axial direction. The pulley widths of the drive pulley 26a and driven pulley 26b change accordingly to vary the winding radius of the belt 26c, thereby continuously varying the ratio (transmission ratio) at which the output of the engine 14 is transmitted to the driven wheels 16.

In other words, as shown in FIG. 2, the CVT 26 is continuously varied in accordance with pulley pressure between a Low ratio (iLow) that is the maximum transmission ratio and an Overdrive transmission ratio (directly coupled ratio (iOD)) that is the minimum transmission ratio.

As stated above, the usual practice in a belt-type CVT is to set the speed-decreasing and speed-increasing ratios at almost equal values centered on a 1:1 ratio, and as shown in FIG. 2, where the ratio upon reaching maximum speed on level ground is defined as iTop, iTop is set to a value larger than iOD (iTop>iOD). Moreover, the shift controller 72 serves as a switching control means that controls switching between the first and second power transmission systems.

Figure 6:
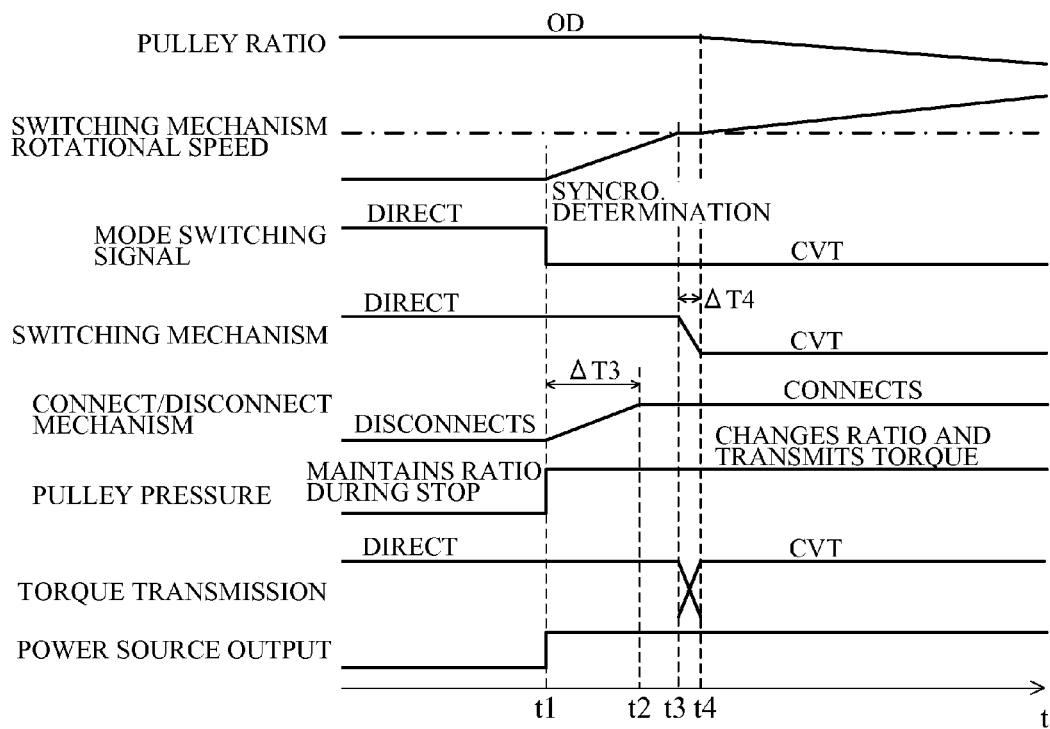
FIG. 6 is a timing chart showing operations when the first power transmission system is established in the automatic transmission apparatus shown in FIG. 1.

FIG. 3 and FIG. 4 are respectively explanatory diagrams of torque flow when the second power transmission system is established, i.e., upon switching from the first power transmission system to the second power transmission system, and when the first power transmission system is established, i.e., upon switching from the second power transmission system to the first power transmission system, and FIG. 5 and FIG. 6 are respectively timing charts showing the timing of operations in FIG. 3 and FIG. 4.

In FIG. 1 and FIGS. 3 to 6, power transmission by means of the first power transmission system using the CVT 26 is denoted "CVT mode," power transmission by means of the second power transmission system using the direct coupling mechanism 46 is denoted "direct-couple mode," operation between these modes is denoted "transition mode," the first clutch 30 and third clutch 50 are denoted "CVT—direct-couple mode switching mechanism," and the second clutch 34 is denoted "wheel (driven wheel)—CVT connection/disconnection mechanism."

Switching from the CVT mode to the direct-couple mode (from the first power transmission system to the second power transmission system) will be explained with reference to FIGS. 3 and 5.

As shown in FIG. 3, the shift controller 72 controls mode switching (first and second power transmission system switching) to pass from the CVT mode through a transition mode 1 and a transition mode 2 to the direct-couple mode.

This will be explained in more detail with reference to FIG. 5. During CVT mode travel, pulley pressures required for transmission ratio change and torque transmission are supplied to the pulleys 26a, 26b, and the rotational speeds of the pulleys 26a, 26b are measured and their ratio calculated from the outputs of the NDR sensor 56 and NDN sensor 60.

At time t1 in the timing chart of FIG. 5, the shift controller 72 compares the rotational speed of the input shaft 12 (rotational speed inputted to the CVT 26) detected from the input shaft rotational speed sensor 54 with the rotational speed of the direct coupling mechanism 46 obtained by correcting the rotational speed detected from the output shaft rotational speed sensor 62 by the transmission ratio of the direct coupling mechanism 46 and commences determination of whether the rotational speed of the input shaft 12 and the rotational speed of the direct coupling mechanism 46 have substantially (or exactly) synchronized (nearly coincided).

When the shift controller 72 determines substantial coincidence at time t2, it outputs a mode switching signal and quickly switches the switching mechanism (during time period ΔT1 between time t2 and time t3) from the CVT 26 side to the direct coupling mechanism 46 side, while keeping the connection/disconnection mechanism (second clutch 34) connected. More specifically, it disconnects the first clutch 30 and connects the third clutch 50 to switch from the CVT 26 side to the direct coupling mechanism 46 side. At this time, the rotational speeds of the input shaft 12 on the CVT 26 side and the direct coupling mechanism 46 side are substantially synchronized, so that the switching can be done in a short time without jolting the vehicle occupants.

When (at time t4) the shift controller 72 determines from the output of the oil pressure switch 64 that the first clutch 30 was disconnected (mode switched from CVT 26 side to direct coupling mechanism 46 side), it gradually discharges hydraulic pressure from the connection/disconnection mechanism of the output shaft 32 (second clutch 34) to gradually disconnect the second clutch 34 during time period ΔT2 between time t4 and time t5. As a result, the rotation of the pulleys 26a, 26b of the CVT 26 is slowly stopped without exerting uncomfortable inertial force on the vehicle occupants.

Next, at time t6, the shift controller 72 determines from the outputs of the NDR sensor 56 and/or the NDN sensor 60 whether the rotation of the pulleys 26a, 26b has stopped, and when it finds that the rotation has stopped, it lowers the pulley pressures to a stopped state ratio maintenance pressure (predetermined pressure), thereby switching completely to the direct-couple mode.

As shown in FIGS. 3 and 5, in the direct-couple mode, among the switching mechanisms, the first clutch 30 is disconnected (on the direct coupling mechanism 46 side) and the connection/disconnection mechanism comprising the second clutch 34 is also disconnected, so that the CVT 26 is in a rotation-stopped state cut off at the input and output.

As transmission ratio change does not readily occur in the rotation-stopped state, the CVT 26 can maintain its transmission ratio even if the pulley pressures are reduced to a low level, so very low pulley pressures of a level sufficient to maintain the overdrive transmission ratio (the stopped state ratio maintenance pressure) are supplied to the CVT 26. As a result, hydraulic pump pressure can be lowered to reduce hydraulic pump loss and improve fuel efficiency.

Next, switching from the direct-couple mode to the CVT mode (from the second power transmission system to the first power transmission system) will be explained with reference to FIGS. 4 and 6.

As shown in FIG. 4, the shift controller 72 controls mode switching (first and second power transmission system switching) to pass from the direct-couple mode through a transition mode 3 and a transition mode 4 to the CVT mode.

This will be explained in more detail with reference to FIG. 6. When it is determined at time t1 that the driver depressed the accelerator pedal in order to accelerate the vehicle 20, the shift controller 72 outputs a mode switching signal for transitioning to the CVT mode and raises the pulley pressures to those required for transmission ratio change and torque transmission.

At time t1, the shift controller 72 commences supply of hydraulic pressure to the connection/disconnection mechanism of the output shaft 32 (the second clutch 34) and connects it gradually up to time t2 (during time period ΔT3). As a result, the rotation of the pulleys 26a, 26b of the CVT 26 is slowly started without exerting uncomfortable inertial force on the vehicle occupants.

Next, at time t3, the shift controller 72 determines whether the rotational speed of the input shaft 12 detected from the NT sensor 54 and the rotational speed of the direct coupling mechanism 46 detected from the output shaft rotational speed sensor 62 have, as stated earlier, substantially (or exactly) synchronized (nearly coincided) (time t3). When the shift controller 72 determines that the rotations are substantially synchronized, it quickly switches the switching mechanism (during time period ΔT4 between time t3 and time t4) from the direct coupling mechanism 46 side to the CVT 26 side. More specifically, it connects the first clutch 30 and disconnects the third clutch 50 to switch from the direct coupling mechanism 46 side to the CVT 26 side.

Since the rotational speeds of the input shaft 12 on the CVT 26 side and the direct coupling mechanism 46 side are substantially synchronized from time t3 to time t4, the switching can be done in a short time without jolting the vehicle occupants.

Owing to the configuration of this embodiment as described in the foregoing, during transmission of power in the CVT mode (by the first power transmission system) using the CVT 26, the speed-decreased rotation of the input shaft 12 is inputted to the third clutch 50 that establishes the second power transmission system by means of the direct coupling mechanism 46, so that the rotational strength and durability of the third clutch 50 do not need to be upgraded and no measure to deal with co-rotation is necessary. In addition, the rotational speed of the direct coupling mechanism 46 is decreased, so that noise can be lowered in proportion.

Figure 12:
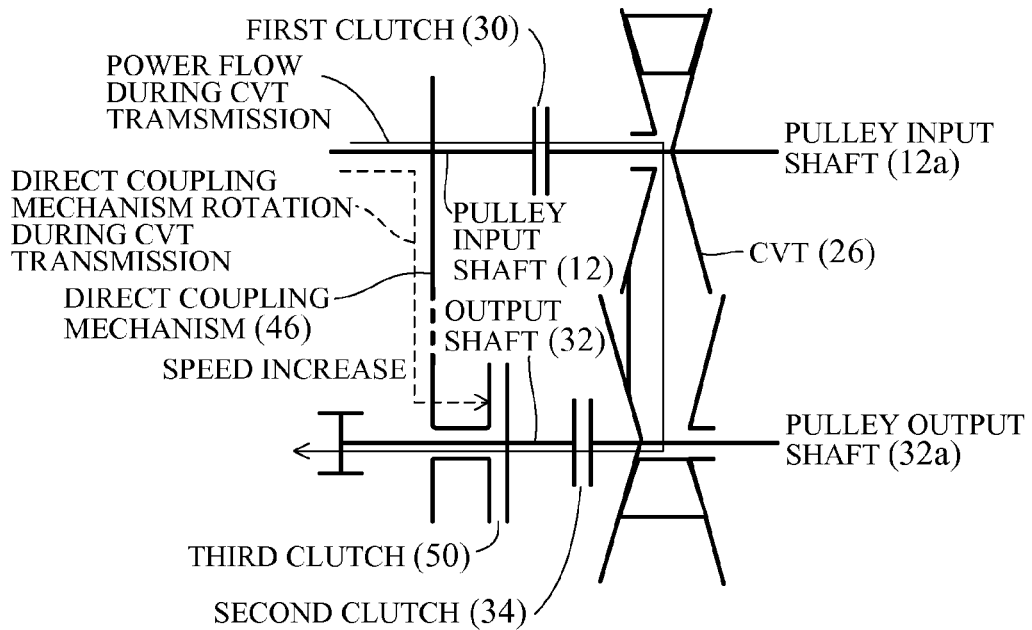
FIG. 12 is a partial schematic diagram showing an automatic transmission apparatus according to Patent Reference 1.

Referring again to FIG. 12, the apparatus according to the technology of Patent Reference 1 comprises a CVT having a drive pulley 26a connected to an input shaft 12 (to a pulley input shaft 12a connected through a first clutch 30), a driven pulley 26b connected to an output shaft 32 (to a pulley output shaft 32a through a second clutch 34), and a belt 26c wound therearound, and, arranged in parallel to the CVT, a direct coupling mechanism 46 that directly connects the input shaft 12 and output shaft 32 and transmits rotation of the input shaft 12 to the output shaft 32 at a predetermined (fixed) transmission ratio, which apparatus is configured to enable power transmission by establishing a CVT mode (first power transmission system) by means of the CVT 26 or a direct-couple mode (second power transmission system) by means of the direct coupling mechanism 46 and configured to connect the direct coupling mechanism 46 to the output shaft 32 through a third clutch.

Therefore, when the CVT mode is established, the flow of power during CVT transmission is as indicated by an arrow (solid line) and rotation of the direct coupling mechanism 46 at this time is as indicated by another arrow (broken line), so that when power is transmitted in CVT mode using the CVT 26, the speed-increased rotation of the output shaft 32 is inputted to the third clutch 50 that establishes the second power transmission system using the direct coupling mechanism 46, thus making it necessary to increase the rotational strength and durability of the third clutch 50 and causing friction loss owing to increased lubrication and other problems.

Figure 13:
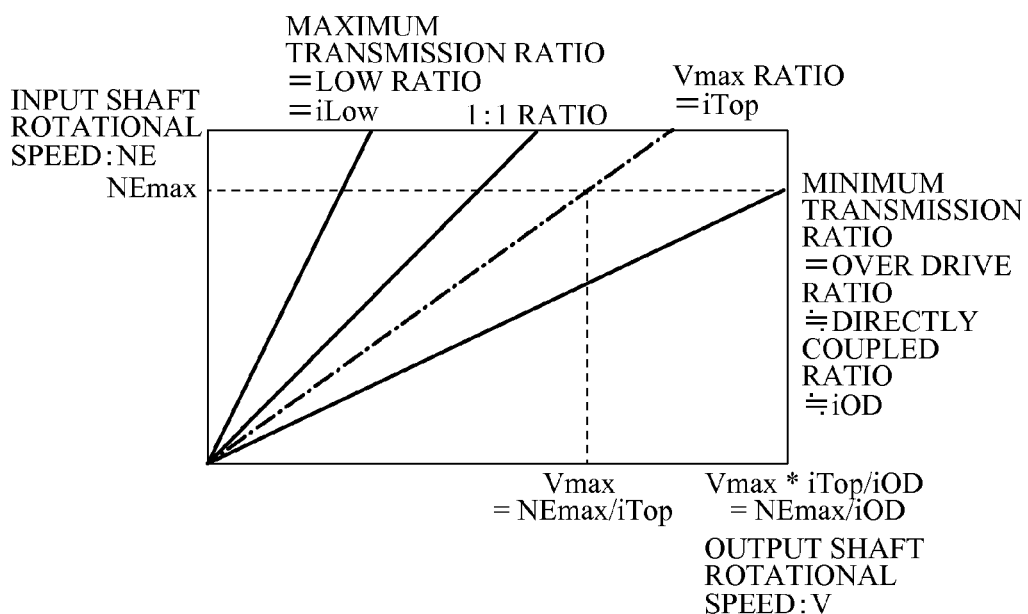
FIG. 13 is an explanatory diagram showing how output shaft rotational speed (vehicle speed) V varies as a function of input shaft rotational speed (engine rotational speed) NE in the automatic transmission apparatus shown in FIG. 12.

In other words, as shown in FIG. 13, when the CVT mode is established, the rotational speed of the direct coupling mechanism 46 is increased, so that at maximum engine rotational speed NEmax, a problem arises in the point of the rotational speed on the direct coupling mechanism 46 side of the third clutch 50 coming to exceed the maximum output shaft rotational speed (Vmax) and reaching Vmax x iTop/iOD. As a result, measures for increasing the rotational strength and durability of the third clutch 50 become necessary, while co-rotation due to overspeed rotation, increased noise of the direct coupling mechanism 46 and other problems also arise.

In contrast, in the automatic transmission apparatus configured according to this embodiment, the predetermined transmission ratio of the direct coupling mechanism 46 is set at the overdrive transmission ratio (minimum transmission ratio) of the CVT 26, the direct coupling mechanism 46 is connected to the input shaft 12 through the third clutch 50, the first clutch 30 and second clutch 34 are connected when the CVT mode is established, while the third clutch 50 is connected and the first clutch 30 and second clutch 34 are disconnected when the direct-couple mode is established. Therefore, as shown in FIG. 1, when the CVT mode is established, the rotational speed of the input shaft 12, which is low in comparison with the rotational speed of the output shaft 32, is inputted to the direct coupling mechanism 46 on the input shaft side, so that the speed of rotation of the direct coupling mechanism 46 on the input shaft 12 side is decreased.

As a result, as shown in FIG. 2, even at the maximum output shaft rotational speed (maximum vehicle speed) Vmax, the input side rotational speed (engine rotational speed NE) falls below the maximum engine rotational speed NEmax and can be kept within NEmax x iOD/iTop. In other words, when power is transmitted in CVT mode using the CVT 26, speed-decreased rotation is inputted to the third clutch 50, so that the durability of the third clutch 50 does not need to be upgraded and the need to deal with co-rotation can be mitigated. In addition, the rotational speed of the direct coupling mechanism 46 is decreased, so that noise can be lowered in proportion.

Further, as shown in FIGS. 3 and 5, particularly FIG. 5, when the direct-couple mode is to be established, the third clutch 50 is connected when the transmission ratio of the CVT 26 in the CVT mode becomes the minimum transmission ratio (overdrive), the first clutch 30 is disconnected (between time t1 and time t3), and, next, when establishment of the direct-couple mode is determined, the second clutch 34 is gradually disconnected (between time t4 and time t5). Owing to this configuration, the third clutch is connected when the rotational speed of the direct coupling mechanism 46 and the rotational speed (NDR) of the drive pulley 26a of the CVT 26 are in a synchronized state (between time t1 and time t4), whereby, in addition to the aforesaid effects, it is possible to establish the direct-couple mode in a short time, i.e., to switch from the CVT mode to the direct-couple mode in a short time, without jolting the vehicle occupants.

In addition, when it is determined that the direct-couple mode is established, the second clutch 34 is gradually disconnected (between time t4 and time t5). Owing to this configuration, the pulley rotation of the CVT 26 can be decreased slowly, so that inertial shock can be reduced and exposure of the vehicle occupants to an uncomfortable inertial force can be more completely avoided.

Moreover, while the direct-couple mode is established, the pulleys 26a, 26b of the CVT 26 are cut off at the input and output, so that loss attributable to rotation of the belt 26c and the pulleys 26a, 26b can be substantially eliminated, and when stopping has been determined by time t5, the pulley pressures can be reduced to the stopped state ratio maintenance pressure at time t6, making it possible to lower hydraulic pump pressure and thereby reduce hydraulic pump loss and improve fuel efficiency. Further, since the pulleys 26a, 26b and belt 26c maintain the overdrive transmission ratio state, no interference, rattle or pounding occurs.

Further, as shown in FIGS. 4 and 6, particularly FIG. 6, when the CVT mode is to be established, the second clutch 34 is gradually connected while the direct-couple mode is still established (between time t1 and time t2), and, next, when substantial synchronization of the rotational speed of the direct coupling mechanism 46 and the rotational speed of the drive pulley 26a of the CVT 26 is determined, the third clutch 50 is disconnected and the first clutch is connected (between time t3 and time t4). Owing to this configuration, the third clutch 50 is disconnected when the rotational speed of the direct coupling mechanism 46 and the rotational speed of the drive pulley 26a of the CVT 26 are in a synchronized state, whereby enabling to establish the CVT mode in a short time, i.e., to switch from the direct-couple mode to the CVT mode in a short time, without jolting the vehicle occupants.

In addition, the second clutch 34 is gradually connected while the direct-couple mode is established (between time t1 and t2). Owing to this configuration, the pulley rotation of the CVT 26 can be increased slowly, so that inertial shock can be reduced and exposure of the vehicle occupants to an uncomfortable inertial force can be more completely avoided, and since the CVT 26 maintains the overdrive transmission ratio while the direct-couple mode is established, transition time between modes can be shortened because no ratio matching is necessary during transitioning.

Embodiment 2

Figure 7:
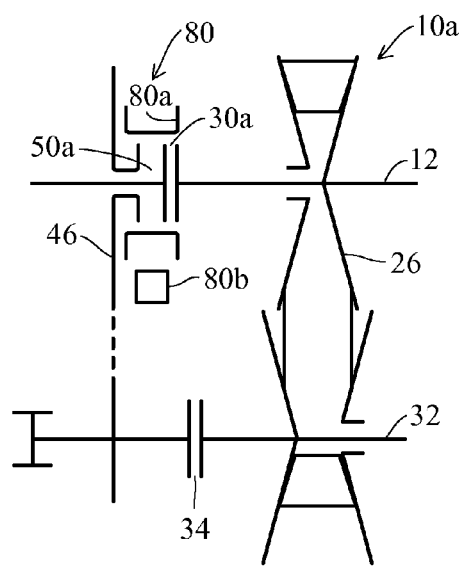
FIG. 7 is a partial schematic diagram showing an automatic transmission apparatus according to a second embodiment of this invention.
Figure 8:
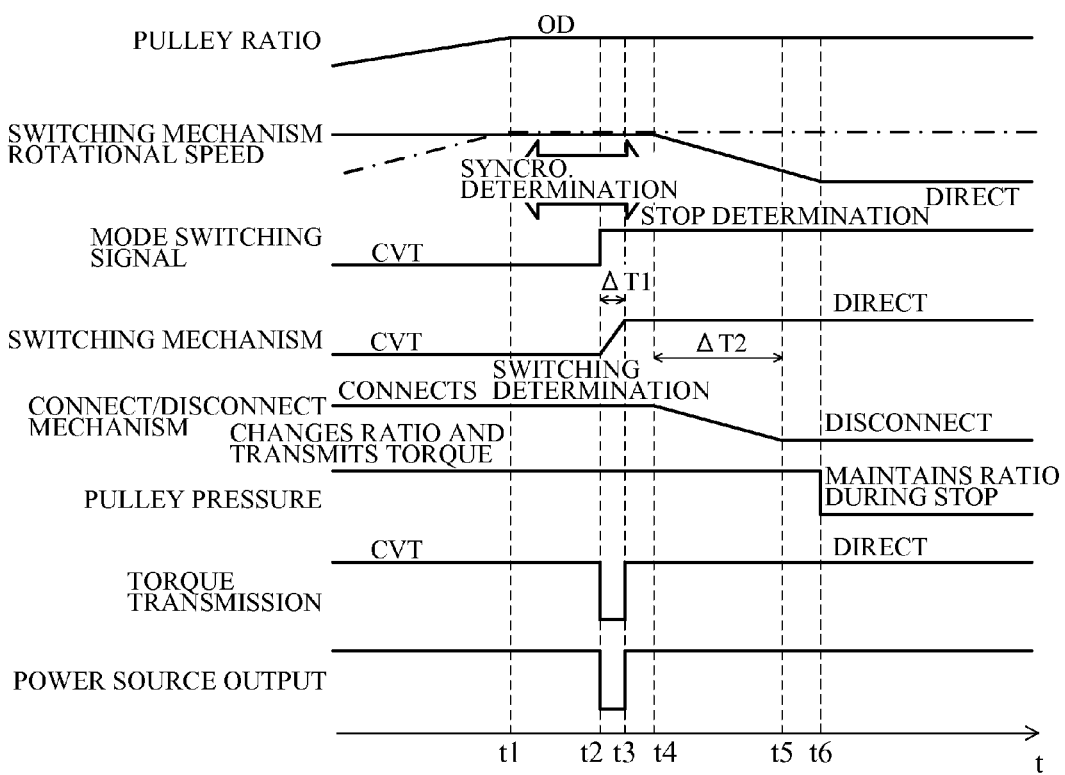
FIG. 8 is a timing chart showing operations when the second power transmission system is established in the automatic transmission apparatus shown in FIG. 7.
Figure 9:
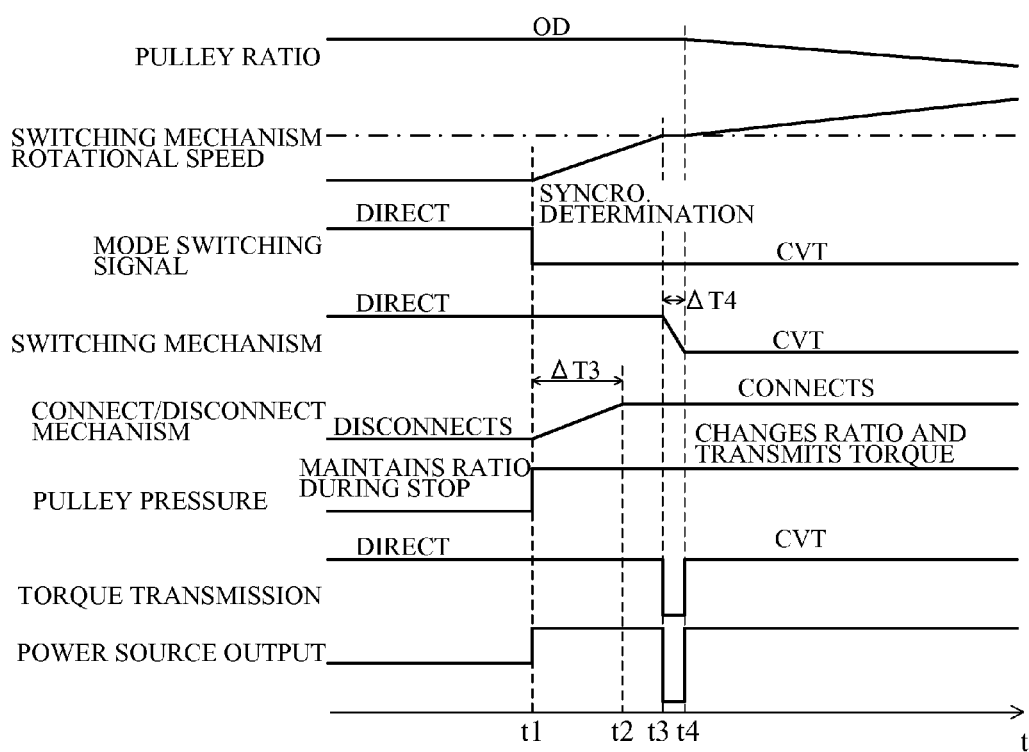
FIG. 9 is a timing chart showing operations when the first power transmission system is established in the automatic transmission apparatus shown in FIG. 7.

FIG. 7 is a partial schematic diagram showing an automatic transmission apparatus (designated by reference symbol 10a) according to a second embodiment of this invention; FIG. 8 is a timing chart of operations for establishing the direct-couple mode, i.e., for switching from the CVT mode (first power transmission system) to the direct-couple mode (second power transmission system) in the second embodiment; and FIG. 9 is a timing chart of operations for establishing the CVT mode, i.e., for switching from the direct-couple mode (second power transmission system) to the CVT mode (first power transmission system) in the second embodiment.

An explanation focused on points of difference from the first embodiment follows. Although the first clutch 30 and third clutch 50 are constituted as hydraulic clutches (friction clutches) in the first embodiment, in the second embodiment the first clutch and third clutch (designated by reference symbols 30a, 50a) are constituted as mechanical dog clutches with toothed engaging surfaces.

Specifically, the outer peripheries of the first clutch 30a and third clutch 50a are provided with a shift mechanism 80. The shift mechanism 80 is of a known structure comprising a sleeve 80a (a shift fork, actuator and other components not shown in FIG. 7). In response to a command from the shift controller 72, one or the other of the first clutch 30a and third clutch 50a is switched into connection with the input shaft 12 (or the pulley input shaft 12a). A stroke sensor 80b provided near the sleeve 80a detects its displacement. Although not a requirement, the shift mechanism 80 is preferably equipped with a synchro-mechanism for synchronizing rotation.

The operation of the automatic transmission apparatus 10a according to the second embodiment will be explained with reference to the timing charts of FIGS. 8 and 9. At or after time t1 in FIG. 8 or at or after time t1 in FIG. 9, the shift controller 72 determines whether the rotational speed of the input shaft 12 (rotational speed inputted to the CVT 26) and the rotational speed of the direct coupling mechanism 46 are substantially synchronized, and when the result is affirmative, disconnects or connects the switching mechanism (the first clutch 30a, third clutch 50a and shift mechanism 80) (more specifically, disconnects or connects the first and third clutches 30a, 50a through the shift mechanism 80) to switch rapidly (during time period ΔT4) from the CVT 26 side to the direct coupling mechanism 46 side, or vice versa.

When the third clutch 50a is a dog clutch, the engine 14 is apt to rev up momentarily at this time. Although this revving must be prevented by lowering the output of the engine 14, the output is reduced in such a very short time that the vehicle occupants are given no sense of idle running.

Owing to the configuration of the second embodiment as described in the foregoing, the first clutch 30a and third clutch 50a can be made compact and light-weight. The remaining aspects of the second embodiment configuration are the same as those of the first embodiment.

Embodiment 3

Figure 10:
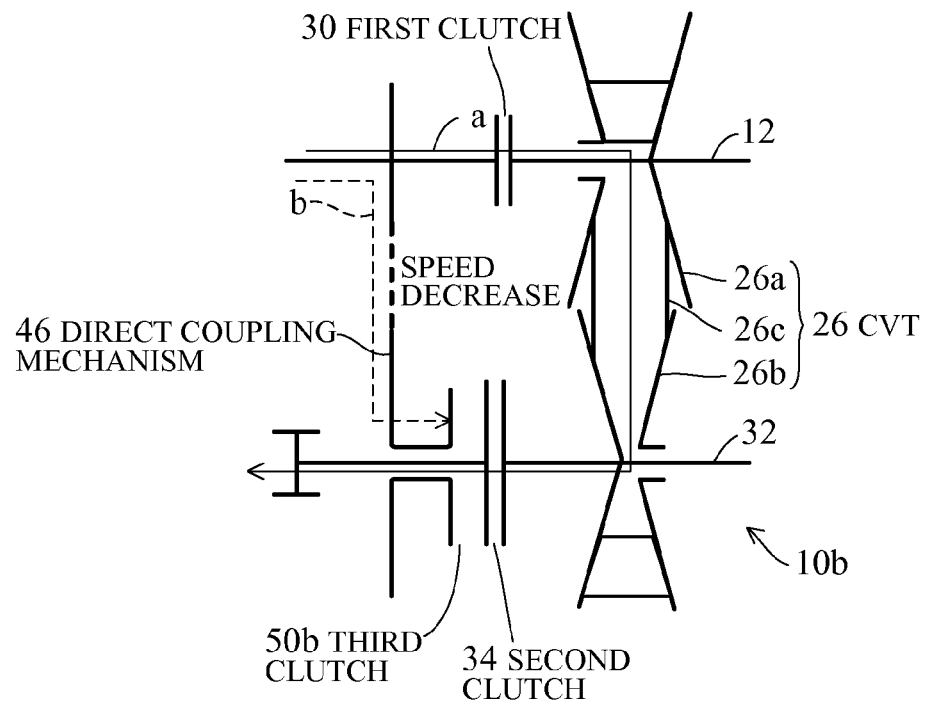
FIG. 10 is a partial schematic diagram showing an automatic transmission apparatus according to a third embodiment of this invention.
Figure 11:
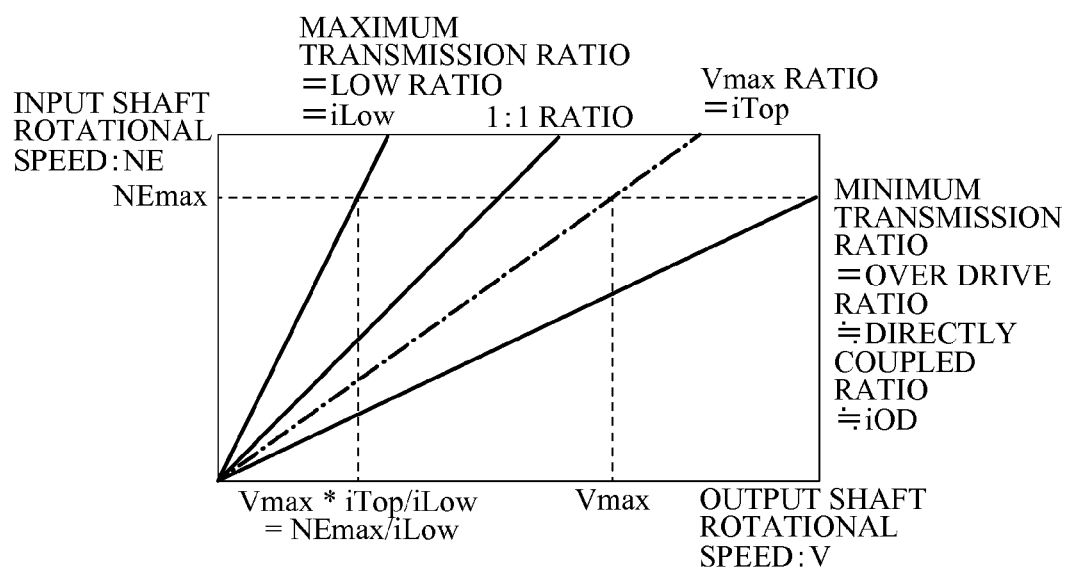
FIG. 11 is an explanatory diagram showing how output shaft rotational speed (vehicle speed) V varies as a function of input shaft rotational speed (engine rotational speed) NE in the automatic transmission apparatus shown in FIG. 10.

FIG. 10 is a partial schematic diagram showing an automatic transmission apparatus (designated by reference symbol 10b) according to a third embodiment of this invention, and FIG. 11 is an explanatory diagram showing how output shaft rotational speed (vehicle speed) V varies as a function of input shaft rotational speed (engine rotational speed) NE in the configuration shown in FIG. 10.

Similarly to in the first embodiment, the automatic transmission apparatus according to the third embodiment also comprises a CVT (continuously variable transmission) 26 having a drive pulley 26a connected to an input shaft 12 (to a pulley input shaft 12a connected through a first clutch 30), a driven pulley 26b connected to an output shaft 32 (to a pulley output shaft 32a through a second clutch 34), and an endless flexible member (e.g., a belt) 26c wound therearound, a direct coupling mechanism 46, arranged in parallel to the CVT 26, that directly connects the input shaft 12 and the output shaft 32 and transmits rotation of the input shaft 12 to the output shaft 32 at a predetermined (fixed) transmission ratio, and control means (shift controller; not shown) for establishing as power transmission means a CVT mode (first power transmission system) by means of the CVT 26 and a direct-couple mode (second power transmission system) by means of the direct coupling mechanism 46, and is configured to connect the first clutch 30 and second clutch 34 when establishing the CVT mode (first power transmission system) and to connect a third clutch (designated by reference symbol 50b) and disengage the first clutch 30 and the second clutch 34 when establishing the direct-couple mode (second power transmission system).

Unlike in the first embodiment, the automatic transmission apparatus 10b according to the third embodiment is configured to set the predetermined transmission ratio of the direct coupling mechanism 46 to the maximum transmission ratio Low (not to the minimum transmission ratio Overdrive) and to connect the direct coupling mechanism 46 through the third clutch 50b to the output shaft 32.

In a belt-type continuously variable transmission like the CVT 26, the pulley pressures (clamping forces) becomes maximum when high torque is transmitted at the Low transmission ratio such as during full-throttle acceleration or hill-climbing. The belt 26c and the pulleys 26a, 26b therefore require corresponding strength and durability. However, an attempt to meet this requirement leads to increased size and weight and higher cost. In view of this, the third embodiment uses the direct coupling mechanism 46 for drive-off and switches to the CVT 26 after drive-off.

In the third embodiment, as shown in FIG. 11, even when the output shaft 32 side of the direct coupling mechanism 46 is operated at decreased speed and the engine rotational speed is the maximum speed NEmax, it can still be kept within Vmax iTop/iLow, so that when power is transmitted in the CVT mode (first power transmission system) using the CVT 26, the speed-decreased rotation of the output shaft 32 is inputted to the third clutch 50b, whereby the durability of the third clutch 50b does not need to be upgraded and the need to deal with co-rotation can be mitigated. In addition, the rotational speed of the direct coupling mechanism 46 is decreased, so that noise can be lowered in proportion.

The automatic transmission apparatus 10b according to the third embodiment differs from the first embodiment in the points that the rotational speed of the direct coupling mechanism 46 is set to Low transmission ratio and that the direct coupling mechanism is connected to the output shaft 32 through the third clutch 50b and switching is performed at the maximum transmission ratio Low. The remaining aspects of the second embodiment configuration are the same as those of the first embodiment.

As set out in the foregoing, the first and second embodiments are configured to have an automatic transmission apparatus 10, 10b, having: an input shaft 12 connected to a power source (engine) 14 installed in a vehicle 20; an output shaft 32 connected to driven wheels 16; a continuously variable transmission (CVT) 26 equipped with a drive pulley 26a (connected through a pulley input shaft 12a) connected through a first clutch 30 to the input shaft 12, a driven pulley 26b (connected through a pulley output shaft 32a) connected through a second clutch 34 to the output shaft 32, and an endless flexible member (belt) 26c wound therearound; a direct coupling mechanism 46 that is arranged in parallel to the continuously variable transmission 26 and directly connects the input shaft 12 and the output shaft 32 to transmit rotation of the input shaft 12 to the output shaft 32 at a predetermined transmission ratio; and a control means (a shift controller 72) that controls establishing of a first power transmission system by means of the continuously variable transmission 26 and a second power transmission system by means of the direct coupling mechanism 46; wherein the improvement comprises: the predetermined transmission ratio of the direct coupling mechanism 46 is set to a minimum transmission ratio of the continuously variable transmission 26 (the overdrive transmission ratio); the direct coupling mechanism 46 is connected to the input shaft 12 through a third clutch 50, 50a; and the control means connects the first clutch 30 and the second clutch 34 and disconnects the third clutch 50, 50a when establishing the first power transmission system, while connecting the third clutch 50, 50a and disconnecting the first clutch 30 and the second clutch 34 when establishing the second power transmission system, by which configuration speed-decreased rotation of the input shaft 12 is inputted to the third clutch 50, 50a when power is transmitted by the first power transmission system using the continuously variable transmission (CVT) 26, whereby the rotational speed inputted to the third clutch 50, 50a that establishes the second power transmission system using the direct coupling mechanism 46 can decreased. As a result, measures for upgrading the rotational strength and durability of the third clutch 50, 50a become unnecessary, the need for measures for dealing with co-rotation and the like can also be eliminated, and the rotational speed of the direct coupling mechanism 46 is decreased, so that noise can be lowered in proportion.

In addition, the first power transmission system and the second power transmission system can be smoothly established without jolting the vehicle occupants, and when the second power transmission system is established, the load on the power source can be reduced because the continuously variable transmission (CVT) 26 is cut off from the power source (engine) 14 and put in a non-rotating state.

Moreover, the control means connects the third clutch 50, 50a and disconnects the first clutch 30 if it is determined that the transmission ratio of the continuously variable transmission (CVT) 26 in the first power transmission system is substantially coincident with the minimum transmission ratio when establishing the second power transmission system, and then disconnects the second clutch 34 gradually when the second power transmission system has been established. Owing to this configuration, the third clutch 50, 50a is connected when the rotational speed of the direct coupling mechanism 46 and the rotational speed of the drive pulley 26a of the continuously variable transmission 26 are in a synchronized state, so that, in addition to the aforesaid effects, it is possible to establish the second power transmission system in a short time, i.e., to switch from the first power transmission system to the second power transmission system in a short time, without jolting the vehicle occupants.

Moreover, when establishment of the second power transmission system is determined, the second clutch 34 is gradually disconnected. Owing to this configuration, the pulley rotation of the continuously variable transmission 26 can be reduced slowly, so that inertial shock can be reduced and exposure of the vehicle occupants to an uncomfortable inertial force can be more completely avoided.

Further, the control means gradually connects the second clutch 34 when the second power transmission system has been established, and then disconnects the third clutch 50, 50a and connects the first clutch 30 if it is determine that the rotational speed of the direct coupling mechanism 46 is substantial synchronized with the rotational speed of the continuously variable transmission 26 when establishing the first power transmission system. Owing to this configuration, the third clutch 50, 50a is disconnected when the rotational speed of the direct coupling mechanism 46 and the rotational speed of the drive pulley 26a of the continuously variable transmission 26 are in a synchronized state, whereby, in addition to the aforesaid effects, it is possible to establish the first power transmission system in a short time, i.e., to switch from the second power transmission system to the first power transmission system in a short time, without jolting the vehicle occupants.

In addition, the second clutch 34 is gradually connected while the second power transmission system is established. Owing to this configuration, the pulley rotation of the continuously variable transmission 26 can be increased slowly, so that inertial shock can be reduced and exposure of the vehicle occupants to an uncomfortable inertial force can be more completely avoided.

Further, since the continuously variable transmission 26 maintains the overdrive transmission ratio while the second power transmission system is established, transition time between the power transmission systems can be shortened because no ratio matching is necessary during transitioning.

Moreover, the continuously variable transmission (CVT) 26 is a transmission operated when supplied with hydraulic oil to the drive pulley 26a and the driven pulley 26b, and the control means lowers the pressure of the hydraulic oil to be supplied to the drive pulley 26a and the driven pulley 26b to a predetermined pressure (the stopped state ratio maintenance pressure) when the second power transmission system has been established. In addition to the aforesaid effects, this configuration also enables improved fuel efficiency.

More specifically, while the second power transmission system is established, the pulleys 26a, 26b of the continuously variable transmission (CVT) 26 are cut off at the input and output, so that loss attributable to rotation of the endless flexible member (belt) 26c and the pulleys 26a, 26b can be substantially eliminated, and the pulley pressures to be supplied to the drive pulley 26a and the driven pulley 26b can be lowered to the predetermined pressures. As a result, the hydraulic pump pressure can be reduced, thereby reducing hydraulic pump loss and improving fuel efficiency. Further, since the pulleys 26a, 26b and the endless flexible member (belt) 26c maintain the overdrive transmission ratio state, no interference, rattle or pounding occurs.

Moreover, since the configuration specifies that the predetermined pressure is set to a pressure sufficient for maintaining the transmission ratio, it enables further pressure reduction and further fuel efficiency improvement in addition to the aforesaid effects.

Although the direct coupling mechanism 46 is configured as a chain type in the first to third embodiments, it can instead be a gear type mechanism. The point is that any type of structure suffices insofar as the direct coupling mechanism 46 can directly connect the input shaft 12 and the output shaft 32 and transmit rotation to the output shaft 32 at the predetermined transmission ratio.

Although the CVT (continuously variable transmission) 26 was indicated as having a metal V-belt structure, a metal chain, resin belt or rubber belt structure is also acceptable. In this sense, the "pulley pressure" used in the foregoing structure is synonymous with clamping force.

Although the first, second and third clutches 30, 34 and 50 were indicated as hydraulic clutches, they can instead be dry clutches or electromagnetic clutches.

Although the predetermined (fixed) transmission ratio of the direct coupling mechanism 46 was indicated as being equal to the minimum transmission ratio of the CVT 26, it does not need to be exactly equal and a ratio within a range of permissible error is acceptable.

Although an engine (internal combustion engine) was indicated for use as the power source having an input shaft, this is not a limitation and the power source can instead be a motor-generator (or a hybrid of a motor-generator and an engine) or the like. As a hybrid vehicle having a motor-generator on the input shaft does not go through the continuously variable transmission when decelerating during high-speed driving, improved regeneration efficiency can be anticipated.

INDUSTRIAL APPLICABILITY

According to the invention, since the predetermined transmission ratio of the direct coupling mechanism arranged in parallel to the continuously variable transmission and directly connects the input shaft and the output shaft to transmit rotation of the input shaft to the output shaft at that predetermined transmission ratio is set to the minimum transmission ratio of the continuously variable transmission, and the direct coupling mechanism is connected to the input shaft through the third clutch, speed-decreased rotation of the input shaft is inputted to the third clutch when power is transmitted by the first power transmission system by means of the continuously variable transmission, whereby the rotational speed inputted to the clutch that establishes the second power transmission system by means of the direct coupling mechanism can be decreased. As a result, measures for upgrading the rotational strength and durability of the third clutch become unnecessary, the need for measures for dealing with co-rotation and the like can also be eliminated, and the rotational speed of the direct coupling mechanism is decreased, so that noise can be lowered in proportion.

DESCRIPTION OF SYMBOLS 10, 10a, 10b automatic transmission apparatus, 12 input shaft, 12a pulley input shaft, 14 internal combustion engine (power source), 16 driven wheels, 20 vehicle, 22 starter mechanism, 24 forward/reverse changeover mechanism, 26 CVT (continuously variable transmission), 26a drive pulley, 26b driven pulley, 26c belt (endless flexible belt), 30, 30a first clutch, 32 output shaft, 32a pulley output shaft, 34 second clutch, 46 direct coupling mechanism, 50, 50a, 50b third clutch, 54 input shaft rotational speed sensor, 56 NDR sensor, 60 NDN sensor, 62 output shaft rotational speed sensor, 64, 66 oil pressure switch, 70 hydraulic circuit, 72 shift controller, 80 shift mechanism

The invention claimed is:

1. An automatic transmission apparatus, having:
   an input shaft connected to a power source installed in a vehicle;
   an output shaft connected to driven wheels;
   a continuously variable transmission equipped with a drive pulley connected through a first clutch to the input shaft, a driven pulley connected through a second clutch to the output shaft, and an endless flexible member wound therearound;
   a direct coupling mechanism that is arranged in parallel to the continuously variable transmission and directly connects the input shaft and the output shaft to transmit rotation of the input shaft to the output shaft at a predetermined transmission ratio; and
   a controller that controls establishing of a first power transmission system by means of the continuously variable transmission and a second power transmission system by means of the direct coupling mechanism;
   wherein the improvement comprises:
   the predetermined transmission ratio of the direct coupling mechanism is set to a minimum transmission ratio of the continuously variable transmission;
   the direct coupling mechanism is connected to the input shaft through a third clutch; and
   the controller connects the first clutch and the second clutch and disconnects the third clutch when establishing the first power transmission system, while connecting the third clutch and disconnecting the first clutch and the second clutch when establishing the second power transmission system.

2. The apparatus according to claim 1, wherein the controller connects the third clutch and disconnects the first clutch if it is determined that the transmission ratio of the continuously variable transmission in the first power transmission system is substantially coincident with the minimum transmission ratio when establishing the second power transmission system, and then disconnects the second clutch gradually when the second power transmission system has been established.

3. The apparatus according to claim 1, wherein the controller gradually connects the second clutch when the second power transmission system has been established, and then disconnects the third clutch and connects the first clutch if it is determine that the rotational speed of the direct coupling mechanism is substantial synchronized with the rotational speed of the continuously variable transmission when establishing the first power transmission system.

4. The apparatus according to claim 2, wherein the continuously variable transmission is a transmission operated when supplied with hydraulic oil to the drive pulley and the driven pulley, and the controller lowers the pressure of the hydraulic oil to be supplied to the drive pulley and the driven pulley to a predetermined pressure when the second power transmission system has been established.

5. The apparatus according to claim 4, wherein the predetermined pressure is set to a pressure sufficient for maintaining the transmission ratio.

6. A method for controlling an automatic transmission apparatus, having:
   an input shaft connected to a power source installed in a vehicle;
   an output shaft connected to driven wheels;
   a continuously variable transmission equipped with a drive pulley connected through a first clutch to the input shaft, a driven pulley connected through a second clutch to the output shaft, and an endless flexible member wound therearound;
   a direct coupling mechanism that is arranged in parallel to the continuously variable transmission and directly connects the input shaft and the output shaft to transmit rotation of the input shaft to the output shaft at a predetermined transmission ratio; and
   controlling establishing of a first power transmission system by means of the continuously variable transmission and a second power transmission system by means of the direct coupling mechanism;

wherein the improvement comprises:
   the predetermined transmission ratio of the direct coupling mechanism is set to a minimum transmission ratio of the continuously variable transmission;
   the direct coupling mechanism is connected to the input shaft through a third clutch; and
   the step of controlling connects the first clutch and the second clutch and disconnects the third clutch when establishing the first power transmission system, while connecting the third clutch and disconnecting the first clutch and the second clutch when establishing the second power transmission system.

7. The method according to claim 6, wherein the step of controlling connects the third clutch and disconnects the first clutch if it is determined that the transmission ratio of the continuously variable transmission in the first power transmission system is substantially coincident with the minimum transmission ratio when establishing the second power transmission system, and then disconnects the second clutch gradually when the second power transmission system has been established.

8. The method according to claim 6, wherein the step of controlling gradually connects the second clutch when the second power transmission system has been established, and then disconnects the third clutch and connects the first clutch if it is determine that the rotational speed of the direct coupling mechanism is substantial synchronized with the rotational speed of the continuously variable transmission when establishing the first power transmission system.

9. The method according to claim 7, wherein the continuously variable transmission is a transmission operated when supplied with hydraulic oil to the drive pulley and the driven pulley, and the step of controlling lowers the pressure of the hydraulic oil to be supplied to the drive pulley and the driven pulley to a predetermined pressure when the second power transmission system has been established.

10. The method according to claim 9, wherein the predetermined pressure is set to a pressure sufficient for maintaining the transmission ratio.

* * * * *